United States Patent
Boehrs et al.

(10) Patent No.: US 8,034,145 B2
(45) Date of Patent: Oct. 11, 2011

(54) AIR FILTER ARRANGEMENT; ASSEMBLY; AND, METHODS

(75) Inventors: Bruce Allen Boehrs, Blaine, MN (US); Paul Anthony Wendt, Bloomington, MN (US); Gregory L. Reichter, Bloomington, MN (US); Stephen W. Sabelko, Prescott, WI (US)

(73) Assignee: Donaldson Company, Inc., Minneapolis, MN (US)

( * ) Notice: Subject to any disclaimer, the term of this patent is extended or adjusted under 35 U.S.C. 154(b) by 545 days.

(21) Appl. No.: 11/629,429

(22) PCT Filed: Jun. 10, 2005

(86) PCT No.: PCT/US2005/020593
§ 371 (c)(1), (2), (4) Date: Dec. 3, 2007

(87) PCT Pub. No.: WO2005/123222
PCT Pub. Date: Dec. 29, 2005

(65) Prior Publication Data
US 2008/0276582 A1 Nov. 13, 2008

Related U.S. Application Data

(60) Provisional application No. 60/579,754, filed on Jun. 14, 2004.

(51) Int. Cl.
*B01D 46/00* (2006.01)
(52) U.S. Cl. ............. 55/502; 55/385.3; 55/503; 55/521; 55/529

(58) Field of Classification Search ................ 55/497, 55/502, 521, DIG. 31, 529, 385.3, 495, 503
See application file for complete search history.

(56) References Cited

U.S. PATENT DOCUMENTS

| | | |
|---|---|---|
| 2,093,877 A | 9/1937 | Pentz |
| 2,270,969 A | 1/1942 | Robinson |
| 2,306,325 A | 12/1942 | Allam |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns et al. |
| 3,494,113 A | 2/1970 | Kinney |
| 3,598,738 A | 8/1971 | Biswell et al. |

(Continued)

FOREIGN PATENT DOCUMENTS

CN 2296402 Y 11/1998

(Continued)

OTHER PUBLICATIONS

PCT Search Report for PCT/US2005/028002 corresponding to WO 2006/17790.

(Continued)

*Primary Examiner* — Robert Clemente
(74) *Attorney, Agent, or Firm* — Merchant & Gould, PC

(57) ABSTRACT

An air filter media construction or arrangement is disclosed. The air filter media construction or arrangement includes strips of media comprising corrugated sheets secured to facing sheets and forming inlet and outlet flutes secured to one another in a stack. Blocked stacked arrangements and slanted stacked arrangements are shown. Such stacked media is provided with molded end pieces to secure and seal opposite side edges of the media strips. Also described are serviceable filter cartridges and air cleaners including the filter cartridges.

14 Claims, 14 Drawing Sheets

U.S. PATENT DOCUMENTS

| | | |
|---|---|---|
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,144,166 A | 3/1979 | Dejovine |
| 4,144,169 A | 3/1979 | Grueschow |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,452,616 A | 6/1984 | Gillingham et al. |
| 4,589,983 A | 5/1986 | Wydevan |
| 4,600,420 A | 7/1986 | Wydeven et al. |
| 4,738,776 A | 4/1988 | Brown |
| 4,755,289 A | 7/1988 | Villani |
| 4,782,891 A | 11/1988 | Cheadle et al. |
| 4,925,561 A | 5/1990 | Ishii et al. |
| 4,979,969 A | 12/1990 | Herding |
| 5,024,268 A | 6/1991 | Cheadle et al. |
| 5,050,549 A | 9/1991 | Sturmon |
| 5,064,799 A | 11/1991 | Monte et al. |
| 5,069,799 A | 12/1991 | Brownawell et al. |
| 5,094,745 A | 3/1992 | Reynolds |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell et al. |
| 5,258,118 A | 11/1993 | Gouritin et al. |
| 5,298,160 A | 3/1994 | Ayers et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda |
| 5,541,330 A | 7/1996 | Wear et al. |
| 5,556,542 A | 9/1996 | Berman et al. |
| 5,562,825 A | 10/1996 | Yamada et al. |
| 5,575,826 A | 11/1996 | Gillingham et al. |
| 5,591,330 A | 1/1997 | Lefebvre |
| 5,643,541 A | 7/1997 | Peddicord et al. |
| 5,662,799 A | 9/1997 | Hudgens et al. |
| 5,718,258 A | 2/1998 | Lefebvre et al. |
| 5,738,785 A | 4/1998 | Brown et al. |
| 5,753,116 A | 5/1998 | Baumann et al. |
| 5,759,217 A | 6/1998 | Joy |
| 5,772,883 A | 6/1998 | Rothman et al. |
| 5,795,361 A | 8/1998 | Lanier, Jr. et al. |
| 5,803,024 A | 9/1998 | Brown |
| 5,820,646 A | 10/1998 | Gillingham et al. |
| 5,853,439 A | 12/1998 | Gieseke et al. |
| 5,891,402 A | 4/1999 | Sassa et al. |
| 5,902,364 A | 5/1999 | Tokar et al. |
| 5,948,248 A | 9/1999 | Brown |
| 6,045,692 A | 4/2000 | Bilski et al. |
| D425,189 S | 5/2000 | Cillingham et al. |
| 6,086,763 A | 7/2000 | Baumann |
| 6,096,208 A | 8/2000 | Connelly et al. |
| 6,098,575 A | 8/2000 | Mulshine et al. |
| 6,129,852 A | 10/2000 | Elliott et al. |
| 6,149,700 A | 11/2000 | Morgan et al. |
| 6,165,519 A | 12/2000 | Lehrer et al. |
| 6,171,355 B1 | 1/2001 | Gieseke et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin, Jr. et al. |
| 6,238,561 B1 | 5/2001 | Liu et al. |
| D444,219 S | 6/2001 | Gieseke et al. |
| 6,261,334 B1 | 7/2001 | Morgan et al. |
| 6,264,833 B1 | 7/2001 | Reamsnyder et al. |
| RE37,369 E | 9/2001 | Hudgens et al. |
| 6,306,193 B1 | 10/2001 | Morgan et al. |
| D450,828 S | 11/2001 | Tokar |
| 6,348,085 B1 | 2/2002 | Tokar et al. |
| 6,350,291 B1 | 2/2002 | Gieseke et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,416,561 B1 | 7/2002 | Kallsen et al. |
| 6,475,379 B2 | 11/2002 | Jousset et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,843,916 B2 | 1/2005 | Burington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 7,001,450 B2 | 2/2006 | Gieseke et al. |
| 7,018,531 B2 | 3/2006 | Eilers et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,258,719 B2 | 8/2007 | Miller et al. |
| 7,282,075 B2 | 10/2007 | Sporre et al. |
| 7,338,544 B2 | 3/2008 | Sporre et al. |
| 7,351,270 B2 | 4/2008 | Engelland et al. |
| 7,396,375 B2 | 7/2008 | Nepsund et al. |
| 7,625,419 B2 | 12/2009 | Nelson et al. |
| 7,655,074 B2 | 2/2010 | Nepsund et al. |
| 7,682,416 B2 | 3/2010 | Engelland et al. |
| 2001/0032545 A1 | 10/2001 | Goto et al. |
| 2002/0060178 A1 | 5/2002 | Tsabari |
| 2002/0073850 A1 | 6/2002 | Tokar et al. |
| 2002/0096247 A1* | 7/2002 | Wydeven ..................... 156/210 |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0218150 A1 | 11/2003 | Blakemore et al. |
| 2004/0035097 A1 | 2/2004 | Schlensker et al. |
| 2004/0060861 A1 | 4/2004 | Winter et al. |
| 2004/0091654 A1 | 5/2004 | Kelly et al. |
| 2004/0140255 A1 | 7/2004 | Merritt et al. |

| | | | |
|---|---|---|---|
| 2004/0173097 A1 | 9/2004 | Engelland et al. | |
| 2004/0187689 A1 | 9/2004 | Sporre et al. | |
| 2004/0221555 A1 | 11/2004 | Engelland et al. | |
| 2004/0226443 A1 | 11/2004 | Gillingham et al. | |
| 2005/0019236 A1 | 1/2005 | Martin et al. | |
| 2005/0166561 A1 | 8/2005 | Schrage et al. | |
| 2005/0173325 A1 | 8/2005 | Klein et al. | |
| 2005/0194312 A1 | 9/2005 | Niemeyer et al. | |
| 2005/0224061 A1 | 10/2005 | Ulrich et al. | |
| 2005/0252848 A1 | 11/2005 | Miller | |
| 2006/0113233 A1 | 6/2006 | Merritt et al. | |
| 2006/0180537 A1 | 8/2006 | Loftis et al. | |
| 2007/0261374 A1 | 11/2007 | Nelson et al. | |
| 2008/0022641 A1 | 1/2008 | Engelland et al. | |
| 2008/0110142 A1 | 5/2008 | Nelson et al. | |
| 2008/0250766 A1 | 10/2008 | Schrage et al. | |
| 2008/0276582 A1 | 11/2008 | Boehrs et al. | |
| 2008/0307759 A1 | 12/2008 | Reichter et al. | |
| 2009/0057213 A1 | 3/2009 | Schiavon et al. | |
| 2009/0064646 A1 | 3/2009 | Reichter et al. | |
| 2009/0151311 A1 | 6/2009 | Reichter et al. | |
| 2010/0043366 A1 | 2/2010 | Boehrs et al. | |
| 2010/0170209 A1 | 7/2010 | Nelson et al. | |

FOREIGN PATENT DOCUMENTS

| | | |
|---|---|---|
| CN | 2372041 Y | 4/2000 |
| DE | 88 08 632 | 9/1988 |
| DE | 88 08 632 | 10/1988 |
| DE | 296 13 098 | 10/1996 |
| EP | 1 166 843 | 1/2002 |
| EP | 1 166 843 A1 | 1/2002 |
| EP | 1 233 173 A2 | 8/2002 |
| EP | 1 747 053 B1 | 10/2007 |
| FR | 2 214 505 A | 8/1974 |
| GB | 970826 | 6/1963 |
| GB | 970826 | 11/1964 |
| GB | 2 082 932 A | 3/1982 |
| JP | 1-171615 | 12/1987 |
| JP | 1-163408 | 11/1989 |
| JP | 2-25009 | 2/1990 |
| WO | WO 98/12430 | 3/1998 |
| WO | WO 99/00587 | 7/1999 |
| WO | WO 02/092193 | 11/2002 |
| WO | 03/084641 | 10/2003 |
| WO | WO 03/095068 | 11/2003 |
| WO | WO 2004/052504 A2 | 6/2004 |
| WO | WO 2004/054684 A1 | 7/2004 |
| WO | WO 2005/046841 | 5/2005 |
| WO | WO 2005/063358 A2 | 7/2005 |
| WO | WO 2005/077487 A1 | 8/2005 |
| WO | WO 2005/079954 A1 | 9/2005 |
| WO | WO 2005/115581 | 12/2005 |
| WO | WO 2005/123214 A1 | 12/2005 |
| WO | WO 2005/123222 | 12/2005 |
| WO | WO 2006/012386 A2 | 2/2006 |
| WO | WO 2006/017790 A1 | 2/2006 |
| WO | WO 2006/076456 | 7/2006 |
| WO | WO 2006/076479 | 7/2006 |
| WO | WO 2007/009039 A1 | 1/2007 |
| WO | WO 2007/044677 | 4/2007 |

OTHER PUBLICATIONS

PCT Written Opinion for PCT/US2005/028002 corresponding to WO 2006/17790.

Exhibit A—Preliminary Amendment including US claims pending in U.S. Appl. No. 11/659,067 corresponding to PCT/US2005/028002 published as WO 2006/17790.

PCT Search Report for PCT/US2005/019777 corresponding to WO 2005/123214.

PCT Written Opinion for PCT/US2005/019777 corresponding to WO 2005/123214.

Exhibit B—Preliminary Amendment including US claims pending in U.S. Appl. No. 11/629,033 corresponding to PCT/US2005/01977 (published as WO 2005/123214).

PCT Search Report for PCT/US2005/001061, corresponding to WO 2006/076479.

PCT Written Opinion for PCT/US2005/001061, corresponding to WO 2006/076479.

Exhibit C—Preliminary Amendment inclding US pending claims in U.S. Appl. No. 11/795,176 corresponding to PCT/US/2006/001061 (published as WO 2006/076479).

PCT Search Report for PCT/US2006/001021, corresponding to WO 2006/076456.

PCT Written Opinion for PCT/US2006/001021, corresponding to WO 2006/076456.

Exhibit D—Preliminary Amendment including US claims pending in U.S. Appl. No. 11/795,178 corresponding to PCT/US2006/001021 (published as WO 2006/076456).

Exhibit A, Pending Claims in U.S. Appl. No. 12/083,364.

Exhibit B, Pending Claims in U.S. Appl. No. 12/587,991.

Exhibit A, Pending claims corresponding to U.S. Appl. No. 11/659,067, filed Jan. 30, 2007.

Exhibit B, Pending claims corresponding to U.S. Appl. No. 11/795,178, filed Jul. 12, 2007.

Exhibit C, Pending claims corresponding to U.S. Appl. No. 12/587,991, filed Sep. 1, 2010.

Exhibit D, Pending claims corresponding to U.S. Appl. No. 11/629,033, filed Nov. 29, 2010.

Exhibit E, Pending claims corresponding to U.S. Appl. No. 13/079,118, filed Apr. 4, 2011.

Exhibit F, Pending claims corresponding to U.S. Appl. No. 11/795,176, filed Apr. 22, 2011.

Exhibit G, Pending claims corresponding to U.S. Appl. No. 12/083,364, filed Apr. 9, 2008.

* cited by examiner

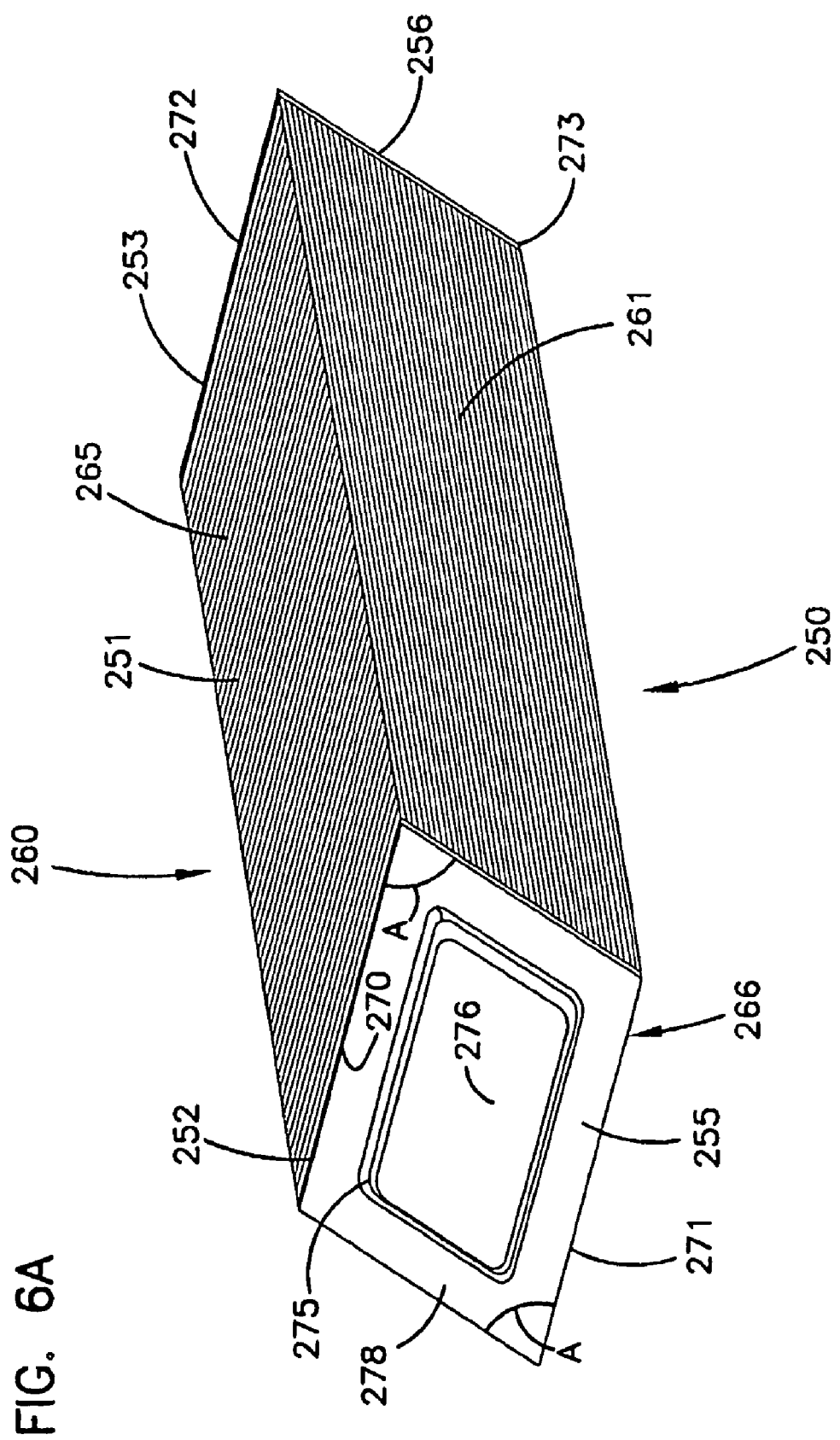

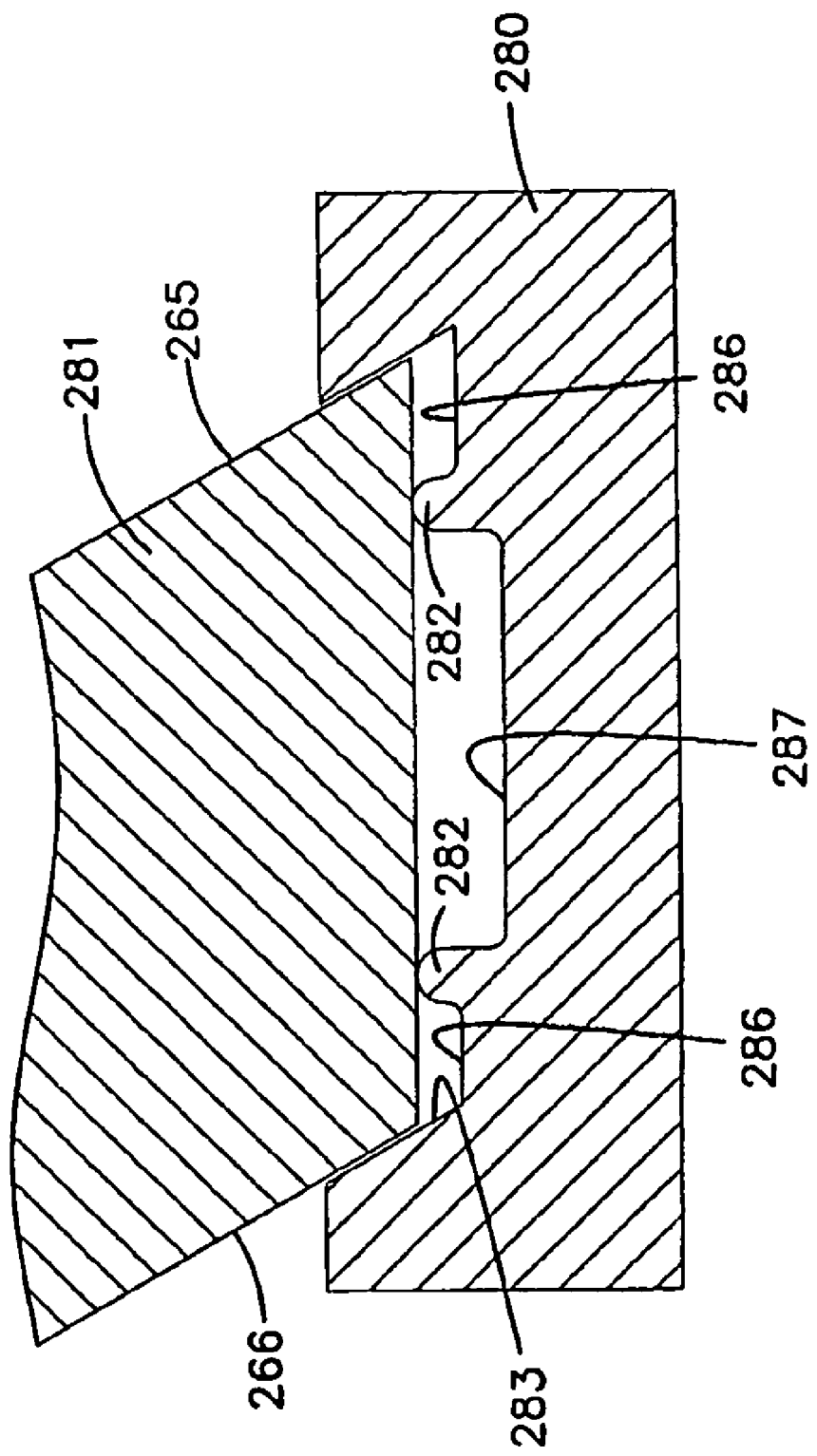

AIR FILTER ARRANGEMENT; ASSEMBLY; AND, METHODS

This application is a National Stage Application of PCT/US2005/020593, filed Jun. 10, 2005, which is the International Application of Ser. No. 60/579,754, filed Jun. 14, 2004 and which application(s) are incorporated herein by reference. A claim of priority to both, to the extent appropriate is made.

CROSS-REFERENCE TO RELATED APPLICATION

The present application is a PCT filing which includes, with some edits, the disclosure of U.S. Application 60/579,754 filed Jun. 14, 2004. Right of priority to the filing of Application 60/579,754 is claimed, to the extent appropriate. The entire disclosure of U.S. Application 60/579,754 is incorporated herein by reference.

FIELD OF THE DISCLOSURE

The present disclosure relates to filter media for use in filtering gases. The disclosure particularly relates to media packs that use z-filter media which comprises a corrugated media sheet secured to facing sheet, formed into a media pack. More specifically, the disclosure relates to such media packs and their inclusion in serviceable filter cartridge arrangements, typically for use in air cleaners. Air cleaner arrangements and methods of assembly and use are also described.

BACKGROUND

Fluid streams, such as air, can carry contaminant material therein. In many instances, it is desired to filter some or all of the contaminant material from the fluid stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the fluid. A variety of fluid filter (air or liquid filter) arrangements have been developed for contaminant rejection. However, continued improvements are sought.

SUMMARY

According to the present disclosure, features useable in preferred filter cartridges, such as air filter cartridges are provided. The features can be used together to provide a preferred filter cartridge, however some advantageous cartridges can be constructed to use only selected ones of the features. In addition, methods of construction and use are provided.

In one aspect of the present disclosure, a preferred media pack is provided, for use in or as air filter cartridges. The media pack comprises a stacked z-filter arrangement having opposite flow faces and opposite sides. At the opposite sides, ends of stacked strips are secured in, and sealed by, molded end pieces. Preferably the molded end pieces comprise molded polyurethane.

In one example arrangement, the stacked z-filter media pack arrangement comprises a slanted stacked z-filter media pack arrangement.

Also according to the present disclosure there is provided a filter cartridge which includes a stacked z-filter arrangement. A filter cartridge depicted also comprises a preform in which the media pack is positioned. The preform preferably comprises four sides and a perimeter seal arrangement. Although alternatives are possible, the perimeter seal arrangement is depicted as an intermediary arrangement, between upstream and downstream ends of the preform.

The perimeter seal arrangement of the preform may be an oblique arrangement as characterized herein. The perimeter seal arrangement may comprise a seal member positioned over a projection integral with a remainder portion of the preform. The preform is preferably a molded component. Preferably the media pack is sealed in the preform, most preferably permanently.

Various preferred features for a preform and a filter cartridge, for a described type of application, are shown.

Also according to the present disclosure an air cleaner arrangement utilizing a preferred filter cartridge as described, is provided. The air cleaner arrangement generally comprises a housing having two sections, separable from one another and configured to engage a seal arrangement of the filter cartridge therebetween, when assembled and secured to one another. Example features for the housing arrangement are provided.

BRIEF DESCRIPTION OF THE DRAWINGS

FIG. 6A is a schematic perspective view of a slanted stacked z-filter media pack arrangement.

FIG. 6B is a schematic cross-sectional view of a mold operation for forming a portion of the media arrangement.

DETAILED DESCRIPTION

I. Z-Filter Media Configurations, Generally

Figure 1:
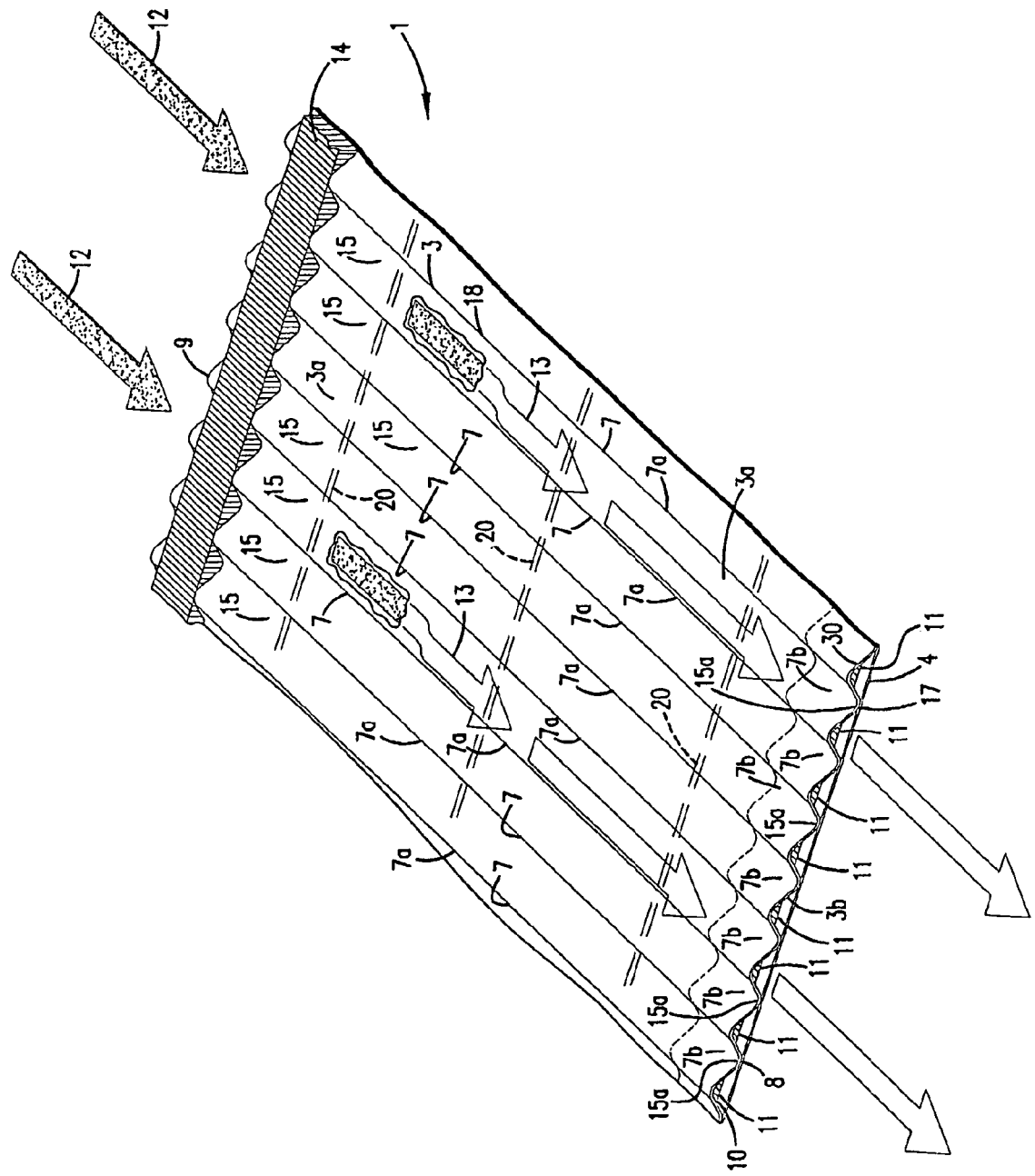
FIG. 1 is a fragmentary, schematic, perspective view of z-filter media useable in arrangements according to the present disclosure.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895, 574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of corrugated media secured to facing media, are stacked on one another, to create a filter construction. An example of this is described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467, 521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end and outlet flow end will be generally flat or planar, with the two parallel to one another. However, variations from this, for example non-planar faces, are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; or, a media pack constructed or formed from such media into a three dimensional network of inlet and outlet flutes; and/or, a filter cartridge or construction including such a media pack.

In FIG. 1, an example of media 1 useable in z-filter media is shown. The media 1 is formed from a corrugated sheet 3 and a facing sheet 4.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, through 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14. Seal bead 14 generally closes flutes 15 to passage of unfiltered fluid therein, adjacent edge 9. Bead 14 would typically be applied as strips of the media 1 are secured to one another during stacking. Thus bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement, not depicted herein, it is referenced as a "winding bead.")

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media, for example as shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 2:
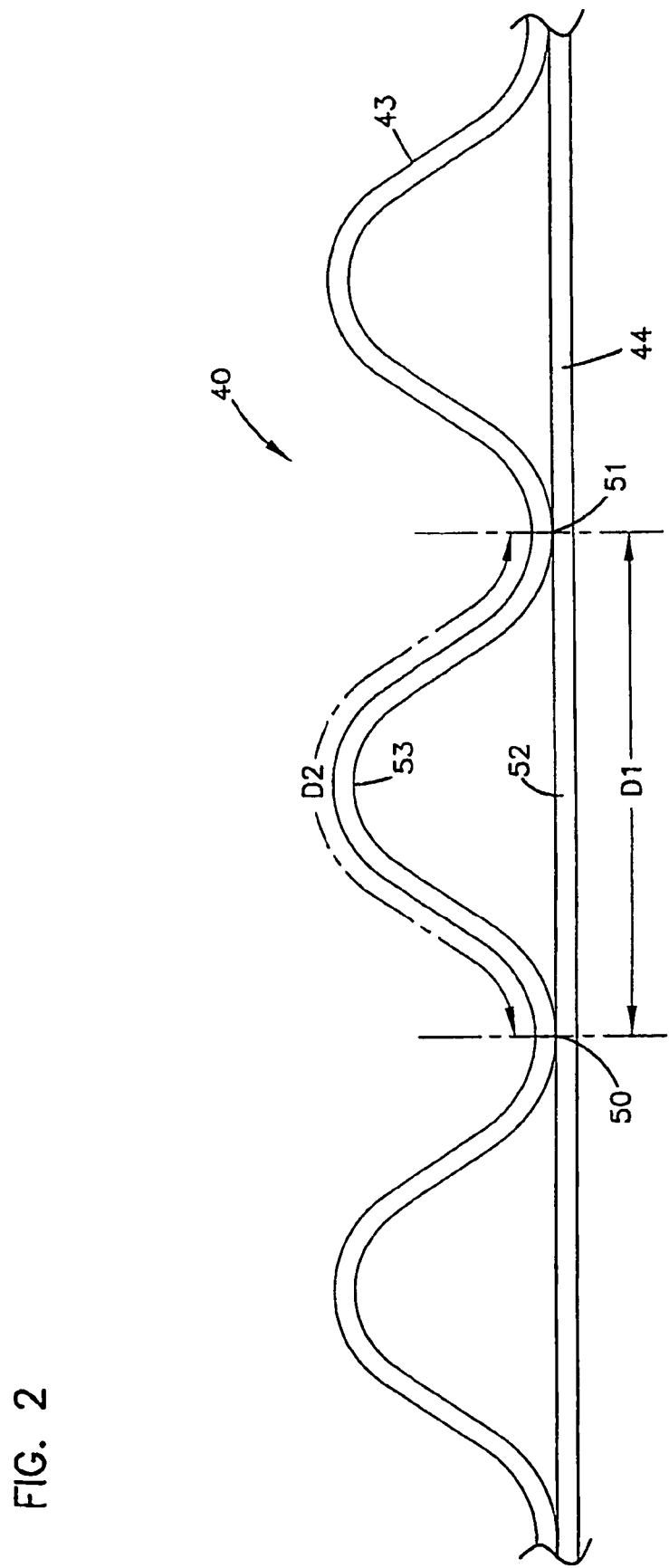
FIG. 2 is an enlarged schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated flat sheet 44, is depicted. The distance D1, between points 50 and 1, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
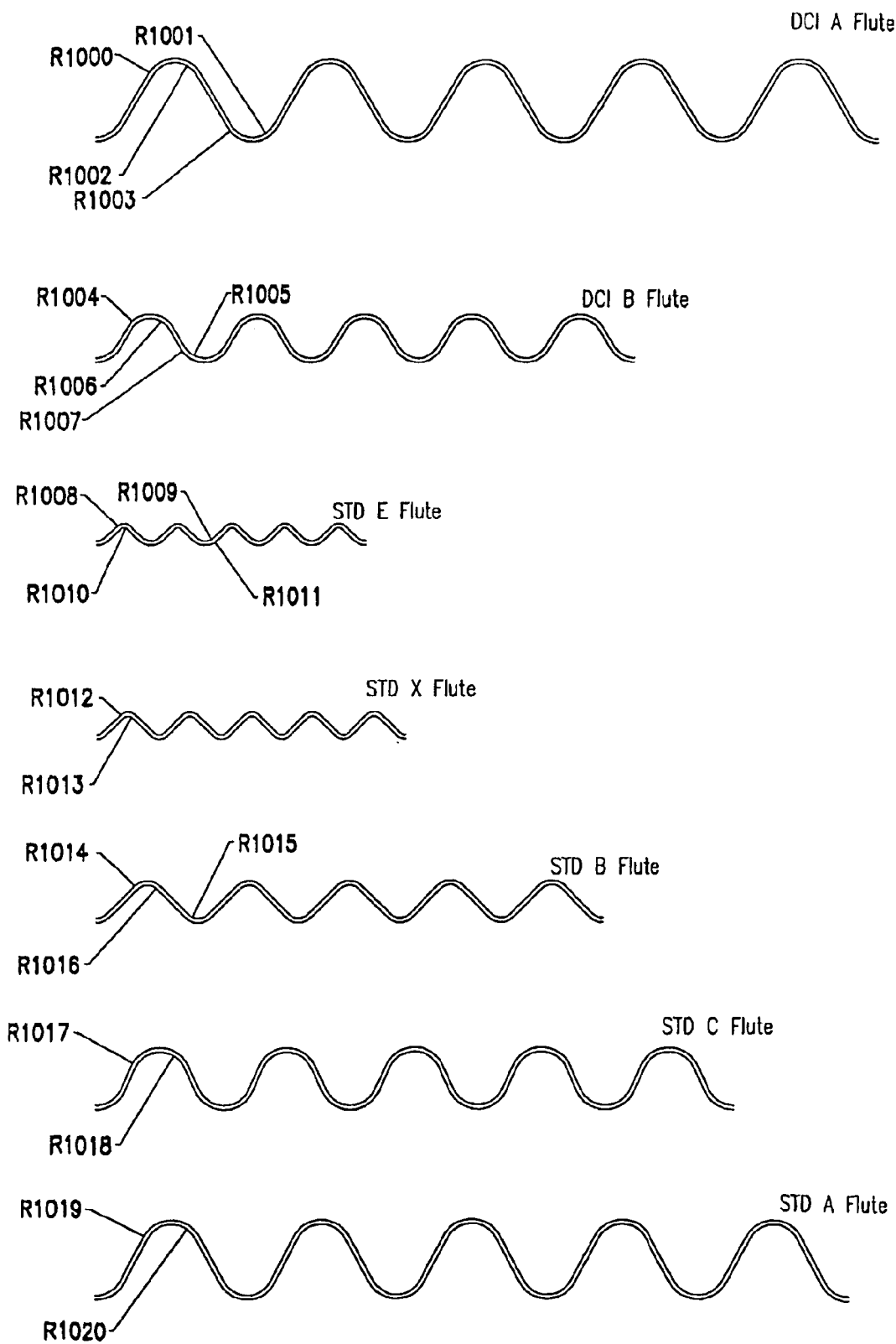
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm);<br>R1001 = .0581 inch (1.476 mm);<br>R1002 = .0575 inch (1.461 mm);<br>R1003 = .0681 inch (1.730 mm). |
| DCI B Flute: | Flute/flat = 1.32:1; The Radii (R) are as follows:<br>R1004 = .0600 inch (1.524 mm);<br>R1005 = .0520 inch (1.321 mm);<br>R1006 = .0500 inch (1.270 mm);<br>R1007 = .0620 inch (1.575 mm). |
| Std. E Flute: | Flute/flat = 1.24:1; The Radii (R) are as follows:<br>R1008 = .0200 inch (.508 mm);<br>R1009 = .0300 inch (.762 mm);<br>R1010 = .0100 inch (.254 mm);<br>R1011 = .0400 inch (1.016 mm). |
| Std. X Flute: | Flute/flat = 1.29:1; The Radii (R) are as follows:<br>R1012 = .0250 inch (.635 mm);<br>R1013 = .0150 inch (.381 mm). |
| Std. B Flute: | Flute/flat = 1.29:1; The Radii (R) are as follows:<br>R1014 = .0410 inch (1.041 mm);<br>R1015 = .0310 inch (.7874 mm);<br>R1016 = .0310 inch (.7874 mm). |
| Std. C Flute: | Flute/flat = 1.46:1; The Radii (R) are as follows:<br>R1017 = .0720 inch (1.829 mm);<br>R1018 = .0620 inch (1.575 mm). |
| Std. A Flute: | Flute/flat = 1.53:1; The Radii (R) are as follows:<br>R1019 = .0720 inch (1.829 mm);<br>R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Stacked Media Configurations Using Fluted Media, Generally

A. Overview of Process; Option of Darting Flutes

Figure 4:
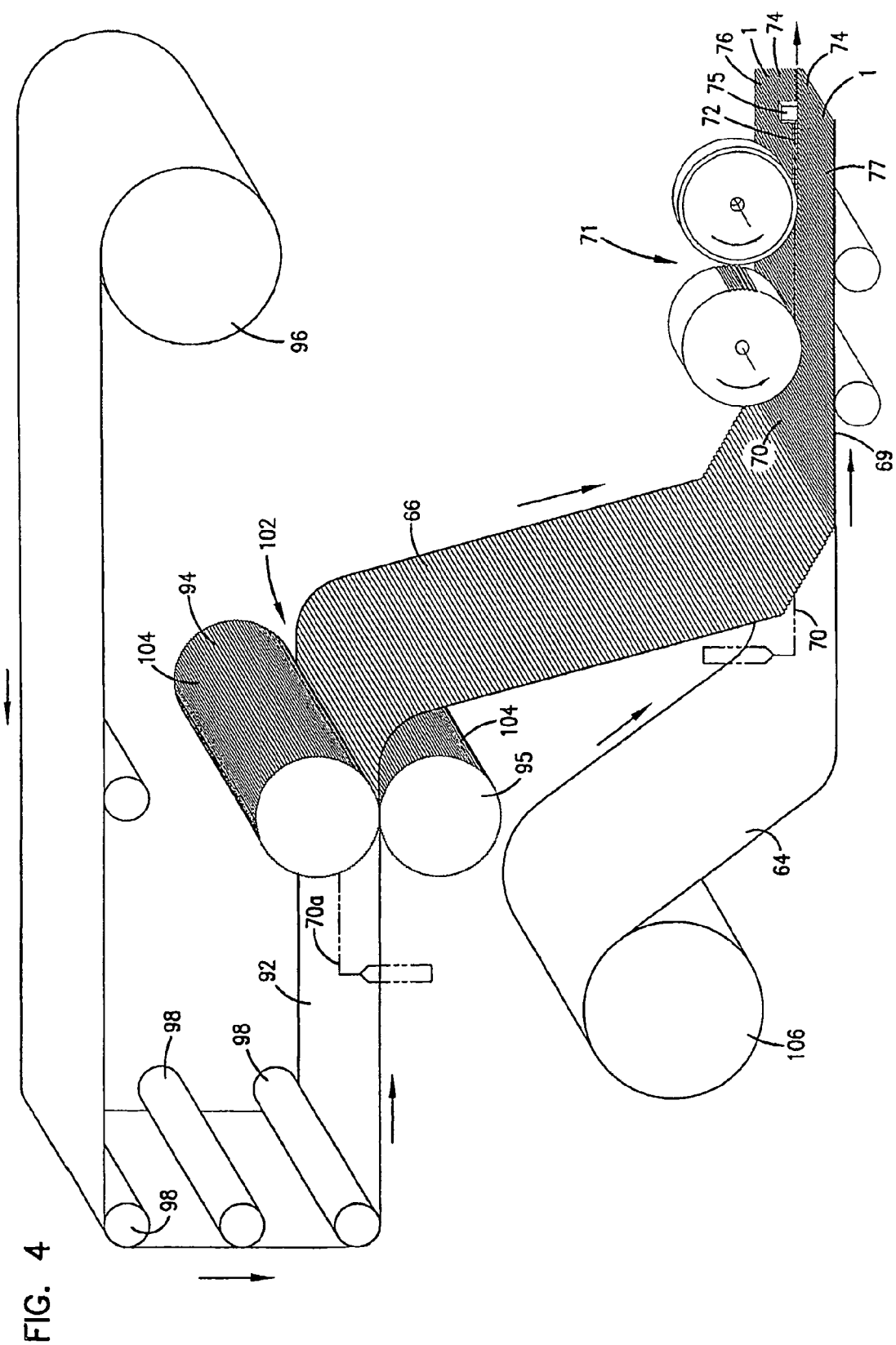
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 14, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, for stacking, as described below in connection with FIG. 6.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One preferred corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In one preferred application, typically D2=1.25-1.35×D1. In some instances the techniques may be applied with curved wave patterns that are not "regular," including, for example, ones that do not use straight flutes.

Figure 5:
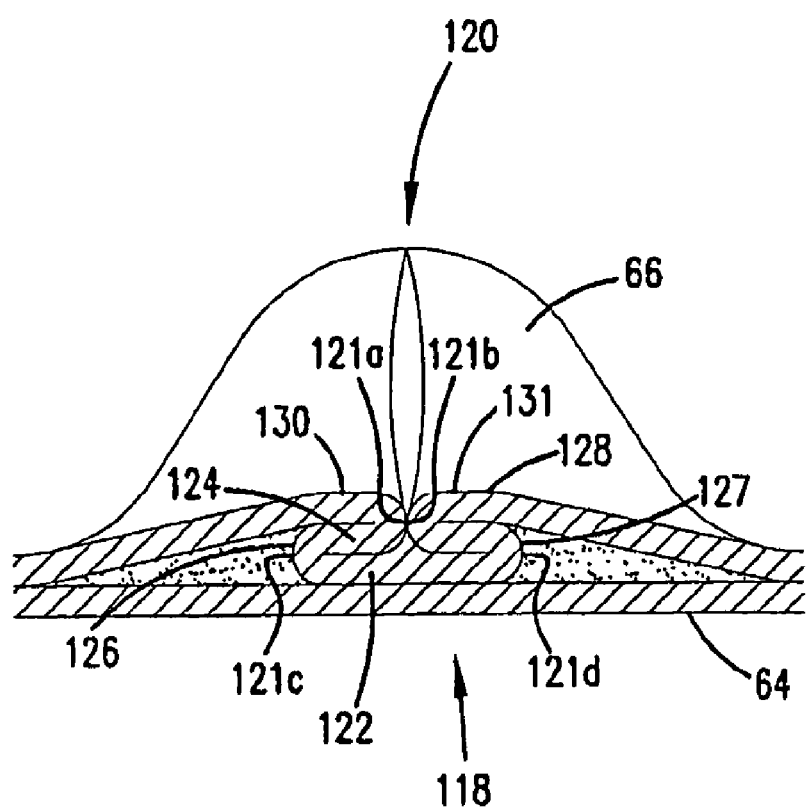
FIG. 5 is a cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Other techniques for media management are described in PCT application US 04/07927, filed Mar. 17, 2004, incorporated herein by reference.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

Figure 6:
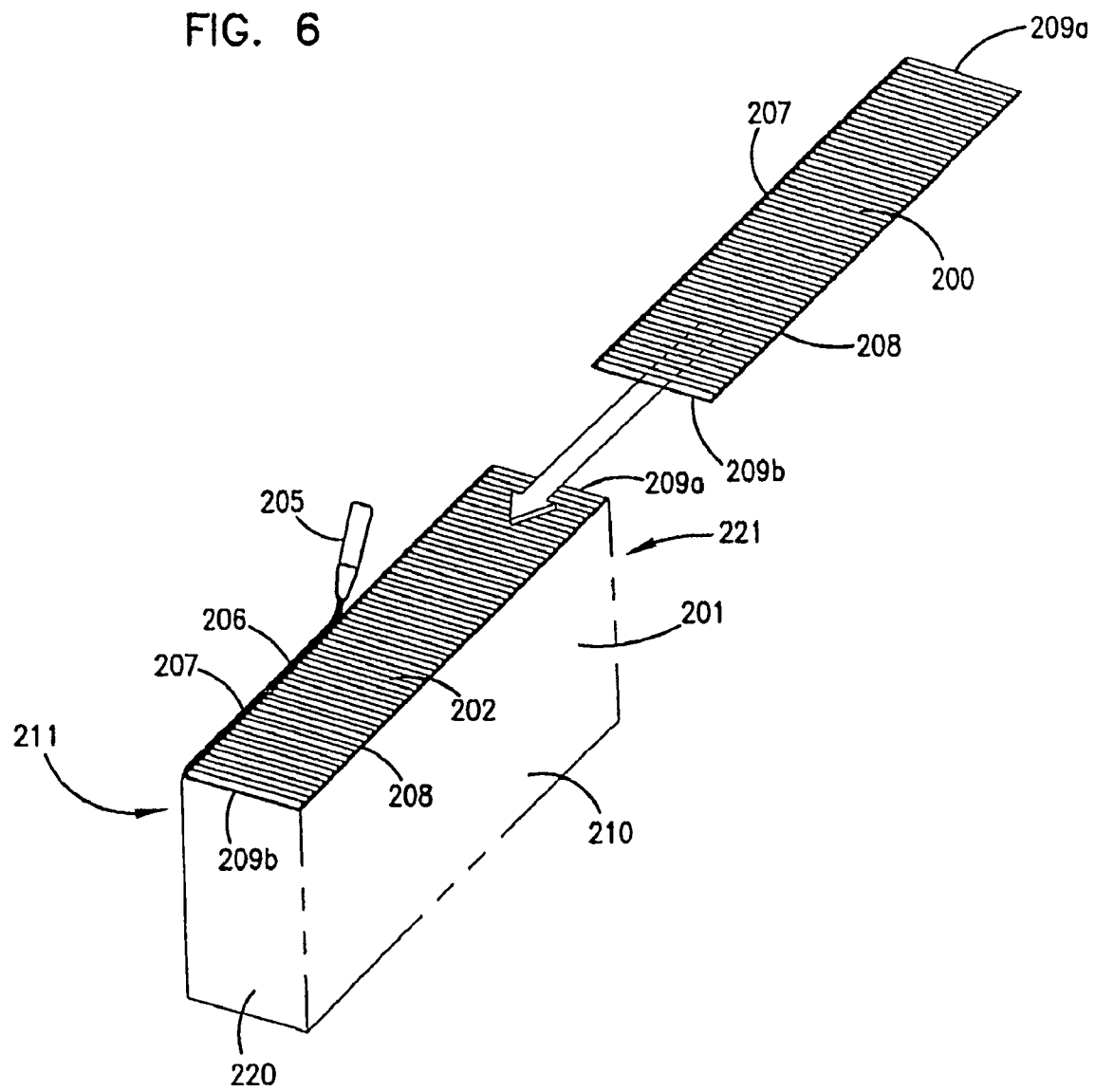
FIG. 6 is a schematic depiction of a step of creating a blocked, stacked z-filter media pack.

In FIG. 6, schematically there is shown a step of forming a stacked z-filter media pack from strips of z-filter media. Referring to FIG. 6, strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 6, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is preferably positioned adjacent the upstream or inlet face 211. The flow faces 210, 211, extend between opposite side faces 220, 221.

The stacked media pack 201 being formed in FIG. 6, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with FIG. 6A and certain of the remaining figures.

In some instances, media pack 201 will be referenced as having a parallelogram shape in any cross-section, meaning that any two opposite side faces extend generally parallel to one another.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that the stacked arrangement at FIG. 6 of U.S. Ser. No. 10/731,504, is a slanted stacked arrangement.

III. Air Cleaner Arrangements Including Stacked Filter Media Pack

A. End Seal Arrangements for Stacked Z-Filter Media Packs.

Herein above, flute seal arrangements for z-filter media are discussed. Flute seals are generally the seal that are provided between the corrugated sheet and the facing sheet (the single facer bead or seal); and, the seal provided between strips in the z-filter media pack (the stacker bead).

Referring to FIG. 6, opposite side edges 209a, 209b of the various strips (200, 201) also need to be sealed against leakage. The sealing in general should be at two locations:
 1. Between the single facer sheet and the corrugated sheet, for each strip or layer (200, 202); and
 2. Between the various strips or layers (200, 202).

The reason seals are preferred at these locations is to inhibit unfiltered air from reaching a downstream portion of an air cleaner arrangement, in which the media pack 201 is used.

Herein, an approach toward provision of side edge seals in stacked media pack is provided. It will be understood by reference to FIG. 6A.

Referring to FIG. 6A, a z-filter media pack 250 is depicted, schematically, comprising strips 251 of z-filter media (corrugated sheet/facing sheet combinations) stacked on one another. Along side edges 252, 253, of the stack of strips 251, seals are required, as noted above.

At side edge 252 an end piece 255 is depicted; and, at side edge 253 an analogous end piece 256 is depicted. The end pieces 255, 256 have the side edges of the various strips 251 secured thereto. Thus, the end pieces 255, 256 can provide side edge seals for single facer strips 251.

Preferably the end pieces 255, 256 are molded with the associated side edges or ends of the strips 251 embedded therein, during molding, to provide the seals. Typically the molded end pieces 255, 256 are molded from polyurethane. Typically and preferably a foamed polyurethane is used. Although alternatives are possible, one form of useable foamed polyurethane is one which is molded to an as-molded density of no greater than 30 lbs/cu.ft. (0.48 g/cc), sometimes no greater than 15 lbs/cu.ft. (0.24 g/cc), and in some instances no greater than 10 lbs/cu.ft. (0.16 g/cc). Although alternatives are possible, in many instances the end pieces 255, 256 will be molded to a hardness, Shore A, of no greater than 30, typically no greater than 25, and often 20 or less, for example 12 to 20. Harder, more dense, materials can be used, but they are not preferred, in some instances, for weight and cost savings.

It is noted that end pieces analogous to end pieces 255, 256 (except rectangular) can be used for the blocked stacked arrangement 201, FIG. 6. However the particular example 250 depicted in FIG. 6A, rather than being a blocked stacked arrangement, is a slanted stacked arrangement; the term "slanted" in this context, being meant to indicate that the opposite flow surfaces 260, 261 do not extend perpendicular to side surfaces 265, 266; the surfaces 265, 266 corresponding to the surfaces across which flutes of the z-filter media pack 250 extend.

Typically and preferably surfaces 260, 261 are parallel to one another and, in overall feature, each is planar. It is noted that each surface 260, 261 actually comprises edges of individual strips stepped from one another, and thus each is not smooth; however in general these media edges will define a planar surface. Thus, the media stack of media pack 250 has a parallelogram shape.

Typically and preferably an acute angle A, referred to herein as the acute slant angle, between one of surfaces 265, 266 and an adjacent one of surfaces 260, 261 is at least 30°, typically within the range of 30-70°, when the media pack is not a blocked, stacked, arrangement. In some arrangements an angle of about 40-50°, such as 45°, is used. For the particular embodiments described herein below in connection with FIGS. 7 and 8, the acute angle A is preferably within the range of about 50°-70°, for example about 60°.

Still referring to FIG. 6A, for the particular media pack 250 depicted, edges 270, 271 of end piece 255 extend parallel to one another, as do corresponding edges 272, 273 of end piece 256. Alternatives are possible.

Attention is directed to mold stand off indent arrangement 275 in end piece 255. An analogous stand off would be found in end piece 256 as well. Stand off indent arrangement 275 is an artifact from a method used to mold the end piece of FIG. 6A. In particular it represents a location in which a mold used to mold piece 255 included a raised portion to engage and support the media ends above a bottom of the mold, during molding. Although not required, it is noted that in some molding operations, the portion of the mold that forms region 276 may be sunken or lower relative to the portion of the molds region 278, as well, to advantage. If this latter is practiced, region 276 will be thicker than region 278.

Attention is now directed to FIG. 6B, which is a schematic, fragmentary cross-sectional view is shown of a molding operation for forming end piece 255. Referring to FIG. 6B, a mold arrangement is indicated at 280, and a media pack is indicated at 281, inserted into the mold for formation of end piece 255, FIG. 6A. At 282, the mold stand off arrangement is shown, against which the media pack 282 would be positioned, within the mold cavity 283. Stand offs 282 will result in the artifact 275, FIG. 6A, in the molded end piece. Resin would cure in regions 286, 287, to cause molding. For the particular arrangement, region 287 is deeper than region 286, for molding advantage relating to the amount of flash that might undesirably extend over surfaces 265, 266 during molding. The media pack 281 can be pinched by the mold, if desired, to control resin flow/rise.

B. A Filter Cartridge Including a Stacked Z-Filter Media Pack and an Outer Preform.

Figure 7:
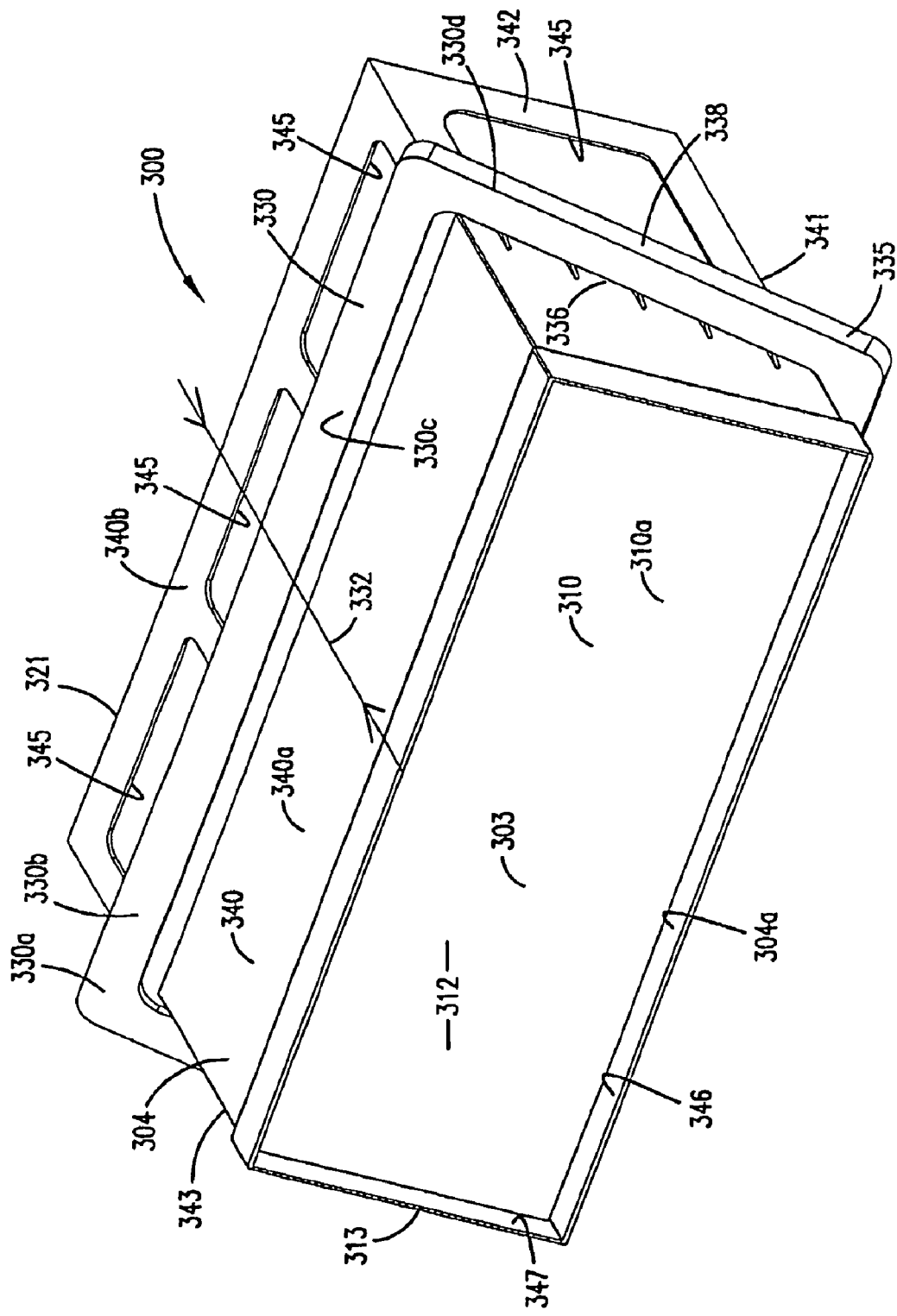
FIG. 7 is a schematic top inlet end perspective view of a filter cartridge including a z-filter media pack according to FIG. 6A therein.

Reference numeral 300, FIG. 7, depicts a filter cartridge or media construction according to the present disclosure. The filter cartridge 300 comprises a media pack 303 contained within a frame piece 304. In use, the filter cartridge 300 would be installed in an air cleaner housing, for example as described below. Typically and preferably the frame piece 304 comprises a single, integral, molded frame piece, with a seal member secured thereto, as described below. By "single, integral" in this context, it is meant that piece 304, except for the seal added thereto, is structurally one piece, formed as an integral piece, for example from a molded plastic, such as a glass filled nylon.

Figure 8:
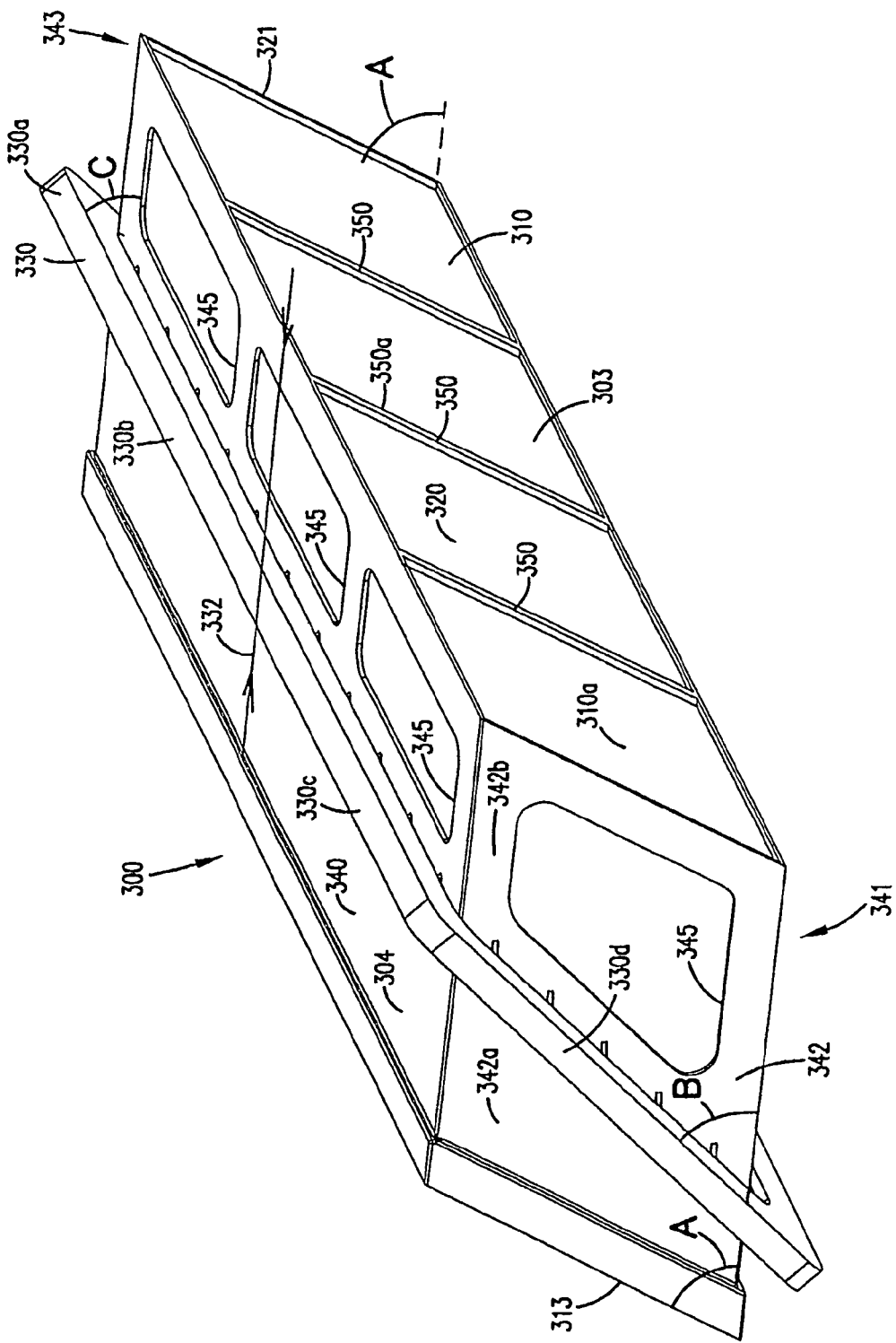
FIG. 8 is a schematic top outlet end perspective view of the filter cartridge of FIG. 7.

Still referring to FIG. 7, media pack 303, shown schematically, typically and preferably comprises a stacked z-filter media arrangement 310, for example as described above in connection with FIGS. 6 and 6A. The stacked media pack arrangement 310 is positioned within interior 304a of frame piece 304 with a media pack inlet flow face 312 positioned aligned with and adjacent open inlet flow end 313 of frame piece 304; and, as seen in FIG. 8, with an outlet flow face 320 positioned aligned with an adjacent opposite open outlet flow end 321 of frame piece 304. The z-filter media pack 310, then, is positioned with inlet and outlet flutes extending generally between opposite, open, flow faces 312 and 320, FIGS. 7 and 8. (In FIGS. 7, 8 and 8A the media pack is depicted schematically and detail of the flutes is not shown.)

It is noted that the particular filter cartridge 300 depicted in FIGS. 7 and 8 is constructed to utilize a slanted stacked z-filter media pack 310a, in particular media pack 250, FIG. 6A. This is preferred for the particular housing, described below in connection with FIGS. 9-14, in which the cartridge 300 is to be positioned in use. However, cartridge 300 could be configured to use alternate stacked arrangements, for example a blocked stacked z-filter media pack arrangement, or a slanted stacked arrangement with a different acute slant angle, for other systems and arrangements.

Referring again to FIG. 7, at 330 a housing seal arrangement is depicted. Herein, the term "housing seal" and variants thereof refer to a seal arrangement on filter cartridge 300, positioned to form a seal with an air cleaner housing, in use. The housing seal arrangement 330 shown includes seal material thereon positioned to releaseably seal against one or more frame pieces of housing sections, when installed. This will be understood by reference to FIGS. 9-10 below. Although alternatives are possible, the particular seal arrangement 330 depicted is an axial pinch seal, 330a. The term "axial" when used in this context, is meant to refer to a seal that operates under compressive forces directed generally in the direction of double headed arrow 332, FIG. 7; i.e., in the direction of extension of the inlet and outlet flutes between opposite media pack flow faces 312, 320. For the particular arrangement 300 depicted, the "axial" direction is a direction through the media pack 303, in a direction of inlet and outlet flow flutes from open flow end 313 to open flow end 321 of frame piece 304.

Figure 10:
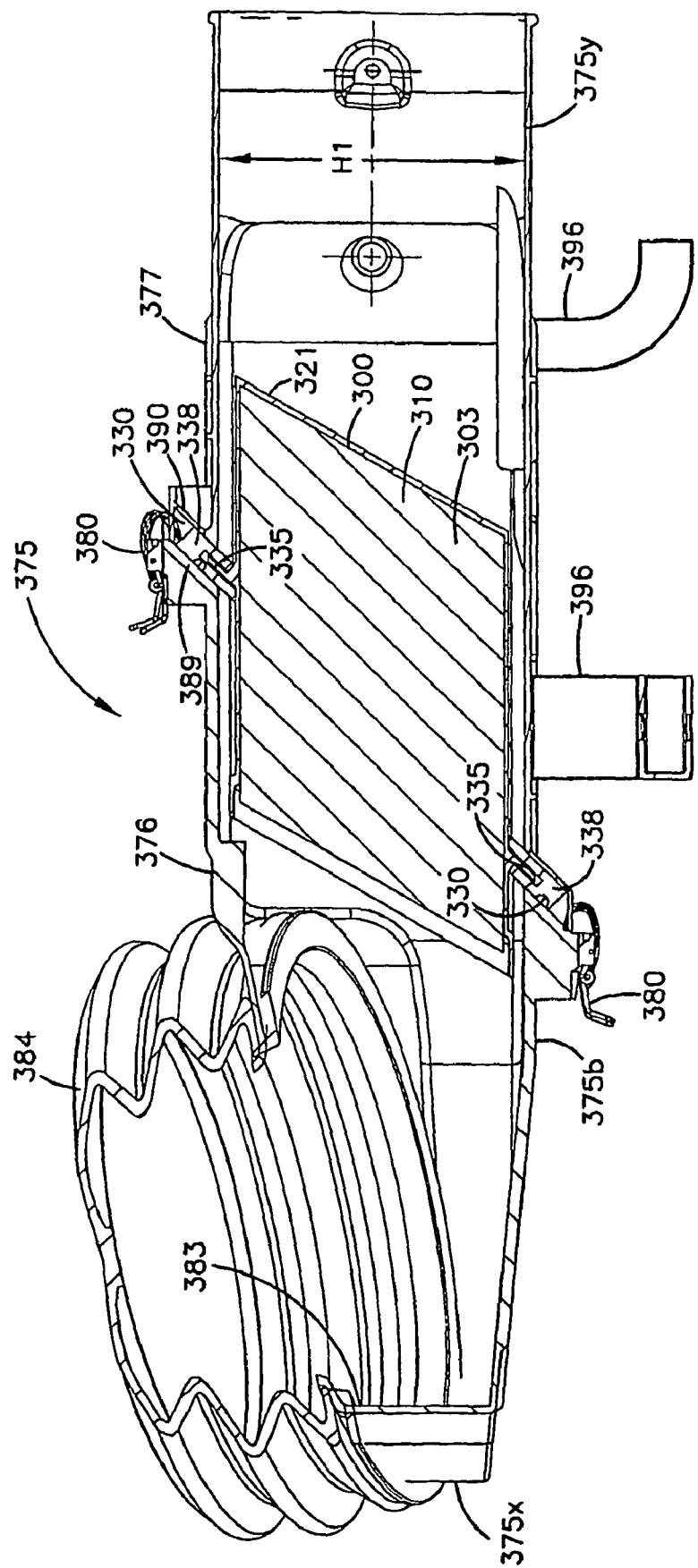
FIG. 10 is a cross-sectional view taken along line 10-10, FIG. 9.

The particular housing seal arrangement 330 depicted, comprises a rigid extension 335 surrounding a remainder 336 of frame piece 304, with a sheath 338 of seal mounted thereon, FIG. 10. The sheath 338 may comprise, for example, a pre-molded neoprene piece having a trough therein, for fitting over extension 335. The preferred rigid extension 335, sometimes called a rigid perimeter projection, would generally have a shape corresponding to sheath 338, and be integrally molded as a remainder of frame piece 304. The sheath 338 would typically be separately added, as a premolded flexible sheath with a groove for receiving extension 335 therein. In some systems sheath 338 may be molded directly to rigid extension 335. In typical applications, however, sheath 338 would be performed and be secured after frame piece 304 had been preformed, using an adhesive or similar connection.

Referring again to FIG. 7, for the particular filter cartridge 300 depicted, the frame piece 304 has a generally rectangular cross-section, taken perpendicularly to the axial directions indicated by double headed arrow 332, and includes first and second opposite (upper and lower) surface panels 340, 341 and first and second opposite sides 342, 343. Although alternatives are possible, as indicated previously frame piece 304 has a generally rectangular cross-section when taken perpendicularly to arrows 332, thus the angle between any two adjacent sides, taken perpendicularly to axial lines 332, is 90°. Panels 340, 341 and sides 342, 343 are sometimes collectively referenced herein as a side wall structure for frame piece 304.

Interior 304a may taper-downwardly in size in extension between end 313 and end 321, for example as a result of a draft angle of 0.2°-0.5°, for molding of frame piece 304. This can be used to help pinch the media pack 303 in position, adjacent end 321.

It is noted that the particular perimeter seal arrangement 330 depicted, is an intermediate perimeter seal arrangement 330b, meaning it is positioned in frame piece 304 at an intermediate location spaced between flow ends 313 and 321. In alternate arrangements, the seal arrangement 330 could be positioned adjacent one or the other of the ends 313, 321, depending upon the particular housing arrangement involved.

Referring to FIG. 7, for the particular embodiment depicted, panel 340 includes sections 340a and 340b. Section 340a is positioned in frame piece 304 upstream of the housing seal arrangement 330, and section 340b is positioned in frame piece 304 downstream of the housing seal arrangement 330.

Figure 8A:
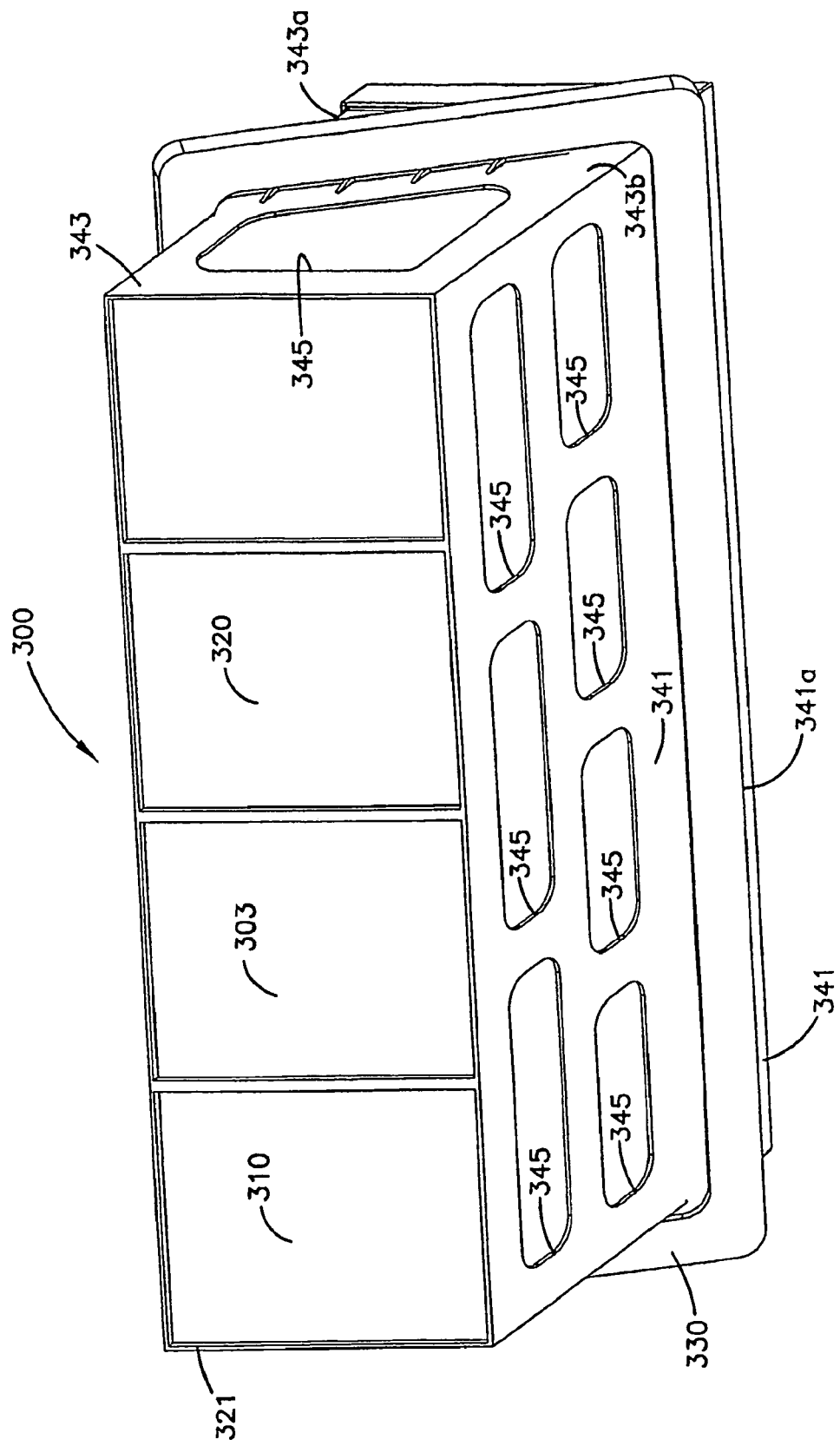
FIG. 8A is a schematic bottom outlet end perspective view of the filter cartridge of FIG. 8.

Similarly, panel 341, FIG. 8A, has a first section 341a in frame piece 304 upstream of the housing seal arrangement 330, and a section 341b in frame piece 304 downstream of the housing seal arrangement 330.

Side panel 342, FIG. 8, has sections 342a and 342b positioned in frame piece 304 on opposite sides of housing seal arrangement 330, with section 342a being upstream and section 342b being downstream. Finally side section 343, FIG. 8A, has section 343a positioned in frame piece 304 upstream of housing seal arrangement 330, and section 343b positioned in frame piece 304 downstream of housing seal arrangement 330.

In general, panel and side sections (340a, 341a, 342a and 343a) positioned upstream of the housing seal arrangement 330 are in an environment on the "dirty air" side of the housing seal arrangement 330, in use. Thus, in use panel sections 340a, 341a, 342a and 343a are preferably solid and have no apertures therein, so that the only access of unfiltered air flow to media pack 303 is through inlet flow face 312, FIG. 7. Collectively, sections 340a, 341a, 342a and 343a are sometimes referred to herein, as an upstream side wall structure or section 304b of frame piece 304.

The requirements with respect to sections 340b, 341b, 342b and 343b, on the downstream side of housing seal arrangements 330, on the other hand, are different. Here, the region surrounding cartridge 300 is exposed to the clean air plenum, and thus apertures can be provided in the sections 340b, 341b, 342b, 343b. In the arrangement shown, apertures are indicated, as examples, at 345. Herein, sections 340b, 341b, 342b and 343b collectively, are sometimes referred to herein as a downstream side wall structure or section 304c, FIG. 7, of frame piece 304.

Apertures 345 provide for weight saving and a cost savings. Weight and cost savings result from the fact that less resin material is needed for drain piece 304. In typical arrangements using apertures 345, each panel section with apertures therein will be at least 20% open (in area), typically at least 40%, usually 50% or more. The particular shapes to apertures 345 can be selected for ornamentation.

Attention is now directed to lip 346, FIG. 7, which comprises a flange 347 around end 313 of the frame piece 304. Flange 347 provides a frame around the media pack 303, into which an end sealant can be placed. The end sealant positioned within the flange 347, between the media pack 303 and the frame piece 304, will secure media pack 303 within frame piece 304 and will prevent unfiltered air from passing between the media pack 303 and the frame piece 304 during use. The flange 347 does not need to be larger than to accommodate a frame of sealant around inlet flow face 312 against the frame piece 304. A flange providing a gap within the range of 2-10 mm outwardly from the media pack 303, over an axial extension or depth with in the range of about 4-20 mm will be sufficient.

Attention is now directed to FIG. 8, in particular to end 321 of frame piece 304. It is noted that end 321 is open, except for cross-pieces 350 therein, extending between panel 340, 341. Cross pieces 350 provide a grid arrangement across downstream face 351 of media pack 303, and thus support the media pack 303 at the downstream face 351 during both assembly and use. Preferably the cross-pieces 350 extend perpendicular to individual single facer layers 251, FIG. 6A, in the media pack 303.

During assembly, the cross pieces 350 operate as a grid system 350a to properly position the media pack 303 when it is inserted through end 313. During operation, the cross-pieces 350 operate as a grid system 350a to inhibit deformation of the media pack 305 under air pressure against inlet face 312.

Referring to FIGS. 7 and 8, again housing seal arrangement 330 is of a type generally referred to herein as a perimeter seal 330b. By the term "perimeter" in this context, it is meant that the seal arrangement 330 extends completely around the z-filter media construction, including media pack 303 or, alternately stated in this instance, around a perimeter of frame piece 304. Although alternatives are possible, the particular housing seal arrangement 330 depicted, with respect to ends 313, 321 is an intermediate seal 330c. Again by the term "intermediate" in this context, it is meant the seal arrangement 330 is positioned spaced between opposite ends 313, 321 of the frame piece 304, and it is not adjacent either one of those ends.

Also, although alternatives are possible, the particular seal arrangement 330 depicted, does not rest entirely in a plane perpendicular to the axial direction indicated by arrows 332. Rather the seal arrangement 300 is in a plane oblique to the axial direction of the frame piece 304. Such a seal arrangement will generally be referred to as an oblique perimeter seal arrangement 330d. The particular oblique seal arrangement 330d provided, is positioned to extend perpendicularly to the axial direction 332, in its direction extension across panels 340, 341, but at a non-perpendicular angle to the axial direction, in extension across the side panels 342, 343. The acute angle B, FIG. 8, of extension across the panels 342, 343 relative to the axial direction 332 is, for example, within the range of 30° to 80°, typically 35° to 60°, although alternatives are possible.

It is noted that the particular oblique perimeter seal depicted, for a housing seal 330, extends at an acute angle B relative to the axial direction 332 (FIG. 8) which is different than an angle A of extension of the flow faces 312, 320, although alternatives are possible. For the particular example shown, the acute angle B relative to the axial direction, of the housing seal arrangement 330, in extension across panels 342, 343, is smaller than the acute angle A (FIG. 6A) of extension of faces 312, 313 versus the axial direction 332.

Referring to FIGS. 7 and 8, it is noted that in extension across panels 340, 341, projection 335 also extends outwardly from panel 340, 341 at an oblique, i.e., non-perpendicular, angle C, FIG. 8. Although alternatives are possible, this will be preferred for certain arrangements. The oblique angle C may be the same as angle B, but such is not required in all examples.

Figure 8B:
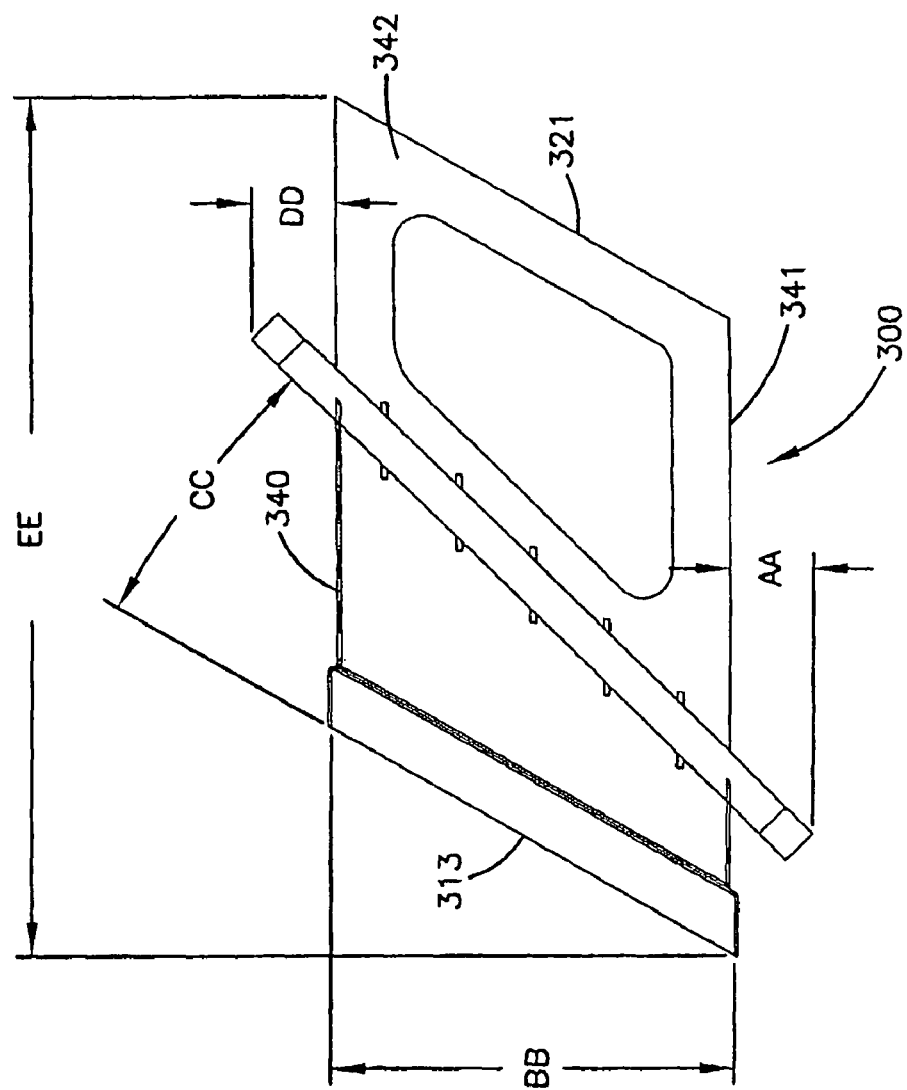
FIG. 8B is a side elevational view of a filter cartridge depicted in FIG. 7.

In FIG. 8B, a side elevational view of cartridge 300 depicted, with certain example angles and dimensions designated as follows:

AA=28.0 mm; BB=135.0 mm; CC=15; DD=28.0 mm; EE=293.4 mm.

The dimensions depicted in FIG. 8B are for example only, and variations are possible within the scope of the current disclosure.

C. An Example Air Cleaner Arrangement, FIGS. 9,10.

Figure 9:
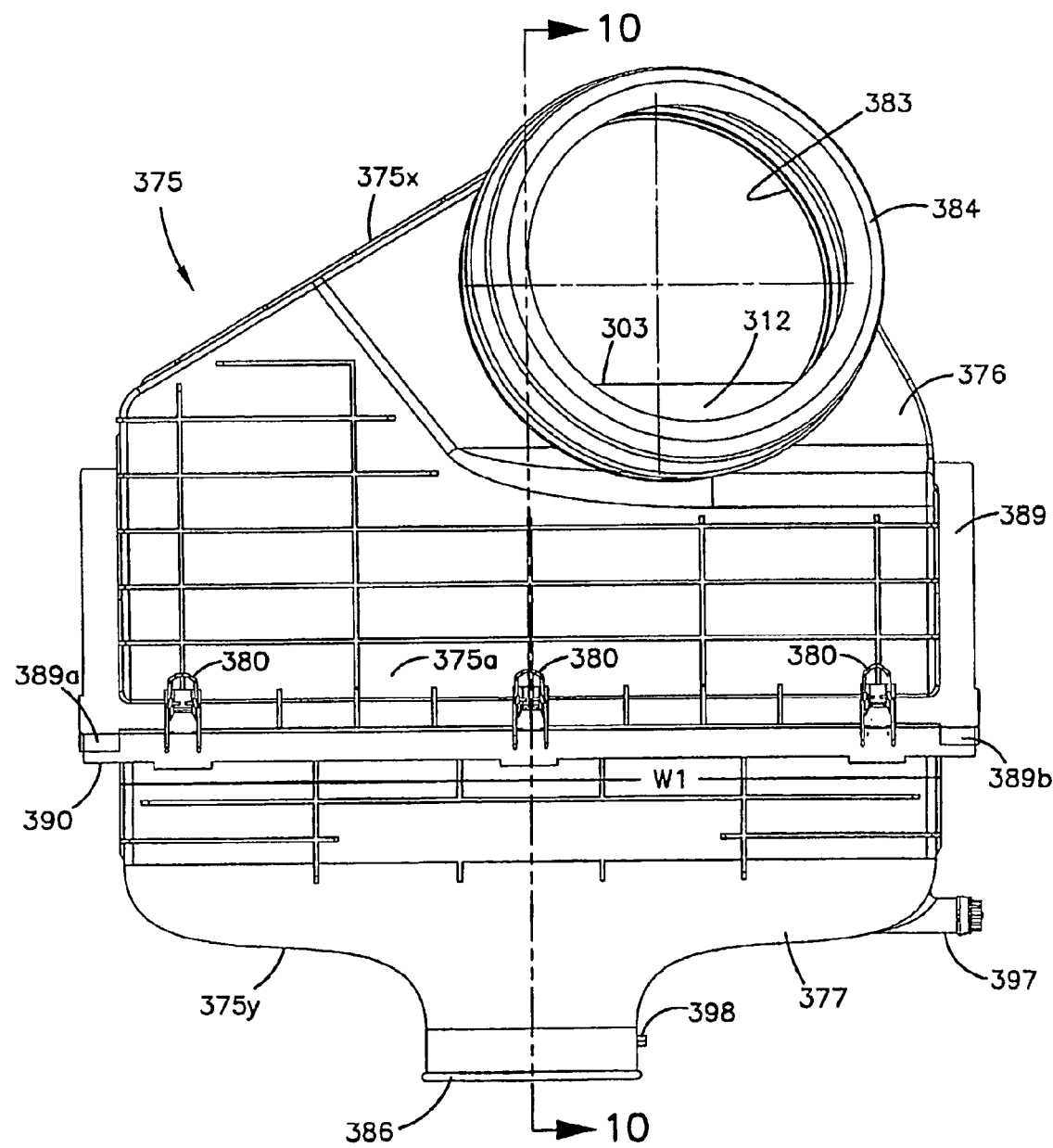
FIG. 9 is a top plan view of an air cleaner arrangement including a filter cartridge according to FIGS. 7-8B therein.

In FIGS. 9, 10 an example air cleaner arrangement useable for a filter cartridge arrangement (or z-filter media construction) according to FIGS. 7 and 8 is depicted. It is noted that a variety of different housing arrangements are possible, the one depicted in FIGS. 9, 10 being an example. With respect to the housing, the filter cartridge is a serviceable component, i.e., it is removable for replacement after use.

Attention is first directed to FIG. 9 in which housing 375 is depicted. The housing 375 comprises separable sections 376, 377, secured together by latches 380. The housing 375 can comprise molded plastic, although alternatives are possible.

Section 376 comprises an inlet section having air flow inlet 383 therein. Mounted over inlet 383 is flexible, collapsible, bellows 384.

Section 377 is an outlet section including air flow outlet 386, through which filtered air leaves air cleaner housing 375 to be directed to downstream engine components.

Housing section 376 includes a perimeter flange 389; and housing section 377 includes perimeter flange 390. Flanges 389 and 390 are configured to engage one another with housing seal arrangement 330 of an internally received filter cartridge corresponding to cartridge 303, FIGS. 7 and 8, therebetween. In general the housing 375 is configured to internally receive upstream frame section 340a, FIG. 7, within housing section 376; and, to internally receive downstream frame section 340b within housing section 377.

Referring to FIG. 10, a side cross-sectional view, the particular housing 375 depicted, is configured to be mounted in the general orientation shown in FIG. 10, with bellows 384 directed upwardly, although alternative housing configurations are possible. The relatively low vertical relief depicted in FIG. 10 is convenient, for mounting the air cleaner 375 in small spaces under the hood of truck, for example on the engine. Mount arrangement 396, FIG. 10, can be used to accomplish this.

In FIG. 10, a bottom of housing 375 is viewable. Referring to FIG. 10, it is noted that mount arrangement 396 is mounted only on section 377, with no portion thereof on section 376. This means that when installed, section 376 can be moved relative to section 377, while section 377 remains anchored in place in equipment in which housing 375 is installed, for example a truck. The movement of section 376 is convenient, to facilitate service access to an internally received filter cartridge.

Referring to FIG. 9, at 397 an air conduit for communication with an air intake for a compressor equipment is shown. At 398, a port for a restriction indicator is depicted.

Also, a water ejector port and valve arrangement (not shown) could be included in section 376. The water ejector port and valve arrangement would typically be positioned to point downwardly, when the housing 375, is installed, and to be upstream from an internally received filter cartridge. (An example water ejector port and valve arrangement is depicted at 395, in the parent U.S. Provisional Application Ser. No. 60/579,754, filed Jun. 14, 2004.)

Comparing FIGS. 9 and 10, it is noted that housing 375 is configured to engage oblique perimeter housing seal arrangement 330 positioned with the seal portion extending across upper face or side 375a of the housing 375 being further from the bellows 384 and inlet 383, than the portion of the housing seal arrangement 330 extending across lower housing face or side 375b. This is convenient for servicing. The housing has opposite ends, FIG. 9, at 375x and 375y, with faces 375a, 375b extending therebetween. In extension across face 375a, the housing seal arrangement 330 is closer to end 375y, than it is to end 375x. In the context of FIG. 10, the terms "upper" and "lower," in reference to surfaces 375a and 375b, is meant to be in reference to the orientation shown. The installation orientation might be different.

Referring again to FIG. 9, it is noted that corners 389a, 389b of flange 389 each comprise a hanger arrangement sized to engage corresponding portions of flange 390 on housing section 377. This will facilitate assembly. In particular, the hangers 389a, 389b will help position section 376 on section 377, without relative movement or slippage while the latches 380 are being operated. In FIG. 9, through inlet aperture 383, one can view a location of the upstream face 312 of the media pack 303. Thus, it can be seen that air directed into inlet aperture 383 does not need to make a complete 90° turn, to begin to encounter the inlet face 315 of the media pack 303.

Although alternatives are possible, disregarding the mounting arrangement 396, the housing for the arrangement depicted, cross-sectional height H1, FIG. 10, is no more than 50% of the width WI, FIG. 9; and, typically no more than 35% of the width WI. Although alternatives are possible, for the typical frame piece 304, the internal height (not including the housing seal arrangement 330 and mount 396) is generally no more than 50% of the cross-sectional width, typically no more than 30% of the cross-sectional width.

Although alternatives are possible, an example media pack 303 useable in the described filter cartridge 300 and housing 375, is one having: a width of 18-26 inches (45.7-66 cm), typically 20-24 in. (50.8-61 cm); a height of 3-10 inches (6.7-25.4 cm), typically 4-6 in. (10.1-15.2 cm); and, a depth (flute length) of about 6-10 in. (15.2-25.4 cm), typically 7-9 in. (17.8-22.9 cm).

What is claimed is:
1. An air filter cartridge comprising:
 (a) a stack of strips of filter media;
  (i) each strip of filter media comprising a sheet of corrugated media secured to facing media;
   (A) each strip of filter media having front and rear edges and side edges extending therebetween;
   (B) the stack of strips defining opposite inlet and outlet flow faces with a set of inlet flutes and a set of outlet flutes extending therebetween;

(C) the stack of strips having first and second, opposite, side faces extending between the inlet and outlet flow faces; and, (D) the stack of strips comprising individual strips stepped from one another to form an inlet flow face that is not perpendicular to a direction of air flow through the stack and an outlet flow face that is not perpendicular to a direction of air flow through the stack;

(b) first and second opposite, separately molded, side pieces;

(i) the first molded side piece having a first side edge of each strip of filter media in the stack of strips embedded therein, during molding of the first molded side piece, to seal the first side edge of each strip of filter media; and, (ii) the second molded side piece having a second side edge of each strip of media in the stack of strips embedded therein, during molding of the second molded side piece, to seal the second side edge of each strip of filter media; and, (c) a housing seal arrangement including a perimeter seal extending around the stack of strips and the first and second, opposite, molded side pieces;

(i) the perimeter seal comprising an axial pinch seal; and, (ii) the housing seal arrangement having sections extending across the first and second molded side pieces at an acute slant angle, to an axial direction between the inlet and outlet flow faces.

2. An air filter cartridge according to claim 1 wherein:
(a) each one of the first and second, opposite, molded side pieces comprise molded polyurethane.

3. An air filter cartridge according to claim 1 wherein:
(a) each one of the first and second, opposite, molded side pieces comprise foamed polyurethane molded to an as-molded density of no greater than 0.48 g/cc.

4. An air filter cartridge according to claim 1 wherein:
(a) each one of the first and second, opposite, molded side pieces comprise foamed polyurethane molded to an as-molded density of no greater than 0.24 g/cc.

5. An air filter cartridge according to claim 1 wherein:
(a) each one of the first and second end pieces is molded to hardness, Shore A, within the range of 12 to 20.

6. An air filter cartridge according to claim 1 wherein:
(a) the housing seal arrangement is positioned spaced from each of the inlet flow face and outlet flow face.

7. An air filter cartridge according to claim 1 wherein:
(a) the air filter cartridge comprises the stack of strips of filter media with the first and second molded side pieces operably positioned within an open interior of a frame piece:

(i) the frame piece comprising a rigid molded frame piece including a sidewall construction extending between the first and second, opposite, open flow ends and defining the open interior; and, (ii) the stack of strips of filter media with the first and second molded side pieces being positioned within the open interior of the frame piece with:

(A) the inlet face of the stack of strips of media aligned with the first open flow end of the frame piece; and, (B) the outlet face of the stack of strips of media aligned with the second open end of the frame piece.

8. An air filter cartridge according to claim 7 wherein:
(a) the housing seal arrangement is positioned on the rigid frame piece.

9. An air filter cartridge according to claim 8 wherein:
(a) the housing seal arrangement includes:
(i) a rigid perimeter projection integral with a remainder of the rigid frame piece; and,
(ii) a housing seal member mounted on, and secured to, the rigid perimeter projection.

10. An air filter cartridge according to claim 7 wherein:
(a) the perimeter housing seal arrangement is an intermediate seal positioned between, and spaced from, the open flow ends in the frame piece.

11. An air filter cartridge according to claim 1 wherein:
(a) the stack of strips comprises a slanted stack having a parallelogram shape and an acute slant angle within the range of 30°-70°, inclusive.

12. An air filter cartridge according to claim 11 wherein:
(a) the stack of strips has an acute slant angle within the range of 50°-70°, inclusive.

13. An air cleaner assembly comprising:
(a) a housing comprising first and second, separable, housing sections defining a housing interior;
(b) an air filter cartridge positioned within the housing interior and comprising a stack of strips of filter media;
(i) each strip of filter media comprising a sheet of corrugated media secured to facing media;
(A) each strip of filter media having front and rear edges and side edges extending therebetween;
(B) the stack of strips defining opposite inlet and outlet flow faces with a set of inlet flutes and a set of outlet flutes extending therebetween;
(C) the stack of strips having first and second, opposite, side faces extending between the inlet and outlet flow faces; and
(D) the stack of strips comprising individual strips stepped from one another to form an inlet flow face that is not perpendicular to a direction of air flow through the stack and an outlet flow face that is not perpendicular to a direction of air flow through the stack;

(b) first and second opposite, separately molded, side pieces;
(i) the first molded side piece having a first side edge of each strip of filter media in the stack of strips embedded therein, during molding of the first molded side piece, to seal the first side edge of each strip of filter media; and,
(ii) the second molded side piece having a second side edge of each strip of media in the stack of strips embedded therein, during molding of the second molded side piece, to seal the second side edge of each strip of filter media; and, (c) a housing seal arrangement including a perimeter seal extending around the stack of strips and the first and second, opposite, molded side pieces;
(i) the perimeter seal comprising an axial pinch seal;
(ii) the air filter cartridge being positioned with the seal arrangement pinched between the first and second housing sections; and,
(iii) the housing seal arrangement having sections extending across the first and second molded side pieces at an acute slant angle, to an axial direction between the inlet and outlet flow faces.

14. An air cleaner assembly according to claim 13 wherein:
(a) the housing has an upper face, an opposite lower face and opposite ends extending between the upper and lower faces;
  (i) the first housing section comprising an inlet housing section; and
  (ii) the second housing section comprising an outlet housing section;
(b) an air flow inlet aperture is positioned in the first housing section and in the upper face of the housing;
  (i) air filter cartridge has a slanted inlet face is positioned within the housing interior with the slanted inlet face directed upwardly towards the inlet aperture; and,
(c) an air flow outlet aperture is positioned in the second housing section, in an end wall thereof.

\* \* \* \* \*